United States Patent
Morishita et al.

(10) Patent No.: US 8,320,022 B2
(45) Date of Patent: Nov. 27, 2012

(54) IMAGE FORMING APPARATUS AND IMAGE FORMING METHOD

(75) Inventors: Koichi Morishita, Tokyo (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/458,340

(22) Filed: Apr. 27, 2012

(65) Prior Publication Data
US 2012/0212751 A1 Aug. 23, 2012

Related U.S. Application Data

(63) Continuation of application No. 12/420,436, filed on Apr. 8, 2009, now Pat. No. 8,199,365.

(30) Foreign Application Priority Data

Apr. 25, 2008 (JP) ................. 2008-116294

(51) Int. Cl.
G06K 15/00 (2006.01)
G06K 15/02 (2006.01)
H04N 1/60 (2006.01)
B41J 29/38 (2006.01)

(52) U.S. Cl. ........ 358/3.09; 358/3.07; 358/1.2; 358/1.9; 347/14

(58) Field of Classification Search ................. 358/3.09, 358/3.07, 1.2, 1.9, 3.26, 502, 1.8, 3.13, 3.06, 358/3.16, 3.19; 347/14, 15, 37, 41, 43
See application file for complete search history.

(56) References Cited

U.S. PATENT DOCUMENTS

| 6,045,210 | A | 4/2000 | Suzuki et al. |
| 6,488,351 | B1 * | 12/2002 | Newkirk et al. ................ 347/15 |
| 6,511,143 | B1 | 1/2003 | Ishikawa et al. |
| 6,533,393 | B1 | 3/2003 | Meyer et al. |
| 6,695,432 | B2 * | 2/2004 | Kanda ............................ 347/41 |

(Continued)

FOREIGN PATENT DOCUMENTS

JP 2-286341 A 11/1990

(Continued)

*Primary Examiner* — Jerome Grant, II
(74) *Attorney, Agent, or Firm* — Fitzpatrick, Cella, Harper & Scinto

(57) ABSTRACT

An image forming apparatus which forms a halftone image on a print medium (200) using multipass processing of scanning a single area on the print medium (200) by a printhead (220) N times and forming dots every scan operation includes a pass division table (410) used to set the print density ratio of each scan operation, a print data generation unit (370) which generates print data of each scan operation, a printer engine (180) which prints a halftone image on the print medium (200) on the basis of the generated print data, and a sensor (340) which detects the state of printing on the print medium (200) by the printer engine (180). The print data generation unit (370) corrects print data in synchronism with printing by the printer engine (180) on the basis of the set print density ratio and the detected printing state.

7 Claims, 13 Drawing Sheets

U.S. PATENT DOCUMENTS

| | | |
|---|---|---|
| 6,698,861 B1 | 3/2004 | Drake |
| 6,707,579 B1 | 3/2004 | Komiya et al. |
| 6,776,468 B2 * | 8/2004 | Miller et al. ............ 347/9 |
| 6,874,864 B1 * | 4/2005 | Maeda et al. ............ 347/41 |
| 7,874,634 B2 | 1/2011 | Horii et al. |
| 2002/0070997 A1 * | 6/2002 | Nakagawa et al. ............ 347/37 |
| 2004/0042047 A1 * | 3/2004 | Kawatoko et al. ............ 358/3.06 |
| 2008/0150991 A1 * | 6/2008 | Yamane et al. ............ 347/14 |
| 2009/0201520 A1 | 8/2009 | Hayashi et al. |
| 2009/0267982 A1 | 10/2009 | Horii et al. |
| 2009/0310150 A1 * | 12/2009 | Marumoto ............ 358/1.8 |

FOREIGN PATENT DOCUMENTS

| | | |
|---|---|---|
| JP | 11-208089 A | 8/1999 |
| JP | 2000-52571 A | 2/2000 |
| JP | 2000-103088 A | 4/2000 |
| JP | 2003-200562 A | 7/2003 |
| JP | 2006-218774 A | 8/2006 |

* cited by examiner

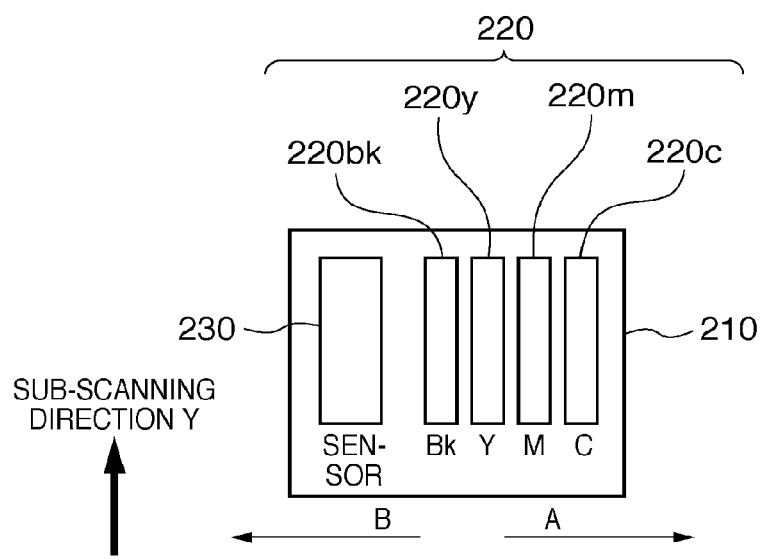

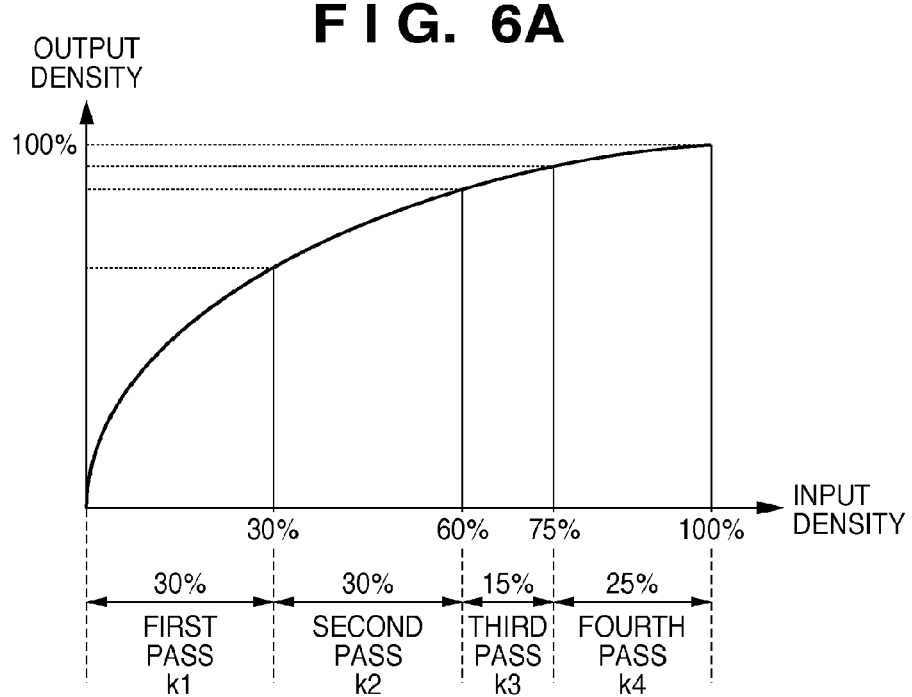
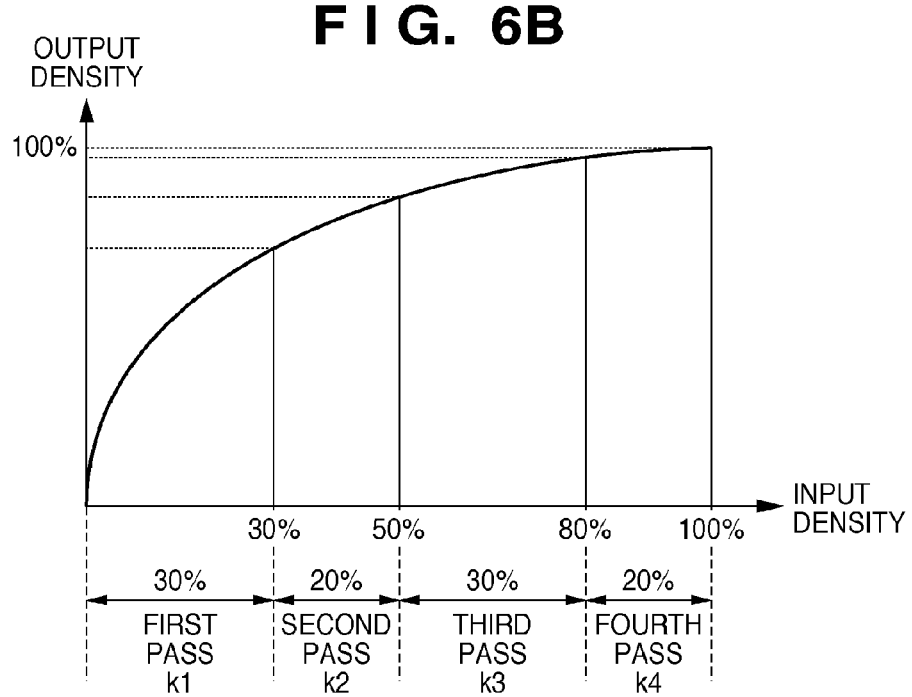

FIG. 7A

| DIVISION RATIO \ PROCESSING LINE | PROCESSING LINES a,c,e,g,i | PROCESSING LINES b,d,f,h |
|---|---|---|
| k1 | 30% | 30% |
| k2 | 30% | 20% |
| k3 | 15% | 30% |
| k4 | 25% | 20% |

FIG. 7B

| DENSITY CORRECTION SELECTION SIGNAL \ PROCESSING LINE | PROCESSING LINES a,c,e,g,i | PROCESSING LINES b,d,f,h |
|---|---|---|
| sel1 | SELECT OUTPUT FROM 460-2 | SELECT OUTPUT FROM 420-2 |
| sel2 | SELECT OUTPUT FROM 420-3 | SELECT OUTPUT FROM 460-3 |
| sel3 | SELECT OUTPUT FROM 460-4 | SELECT OUTPUT FROM 420-4 |

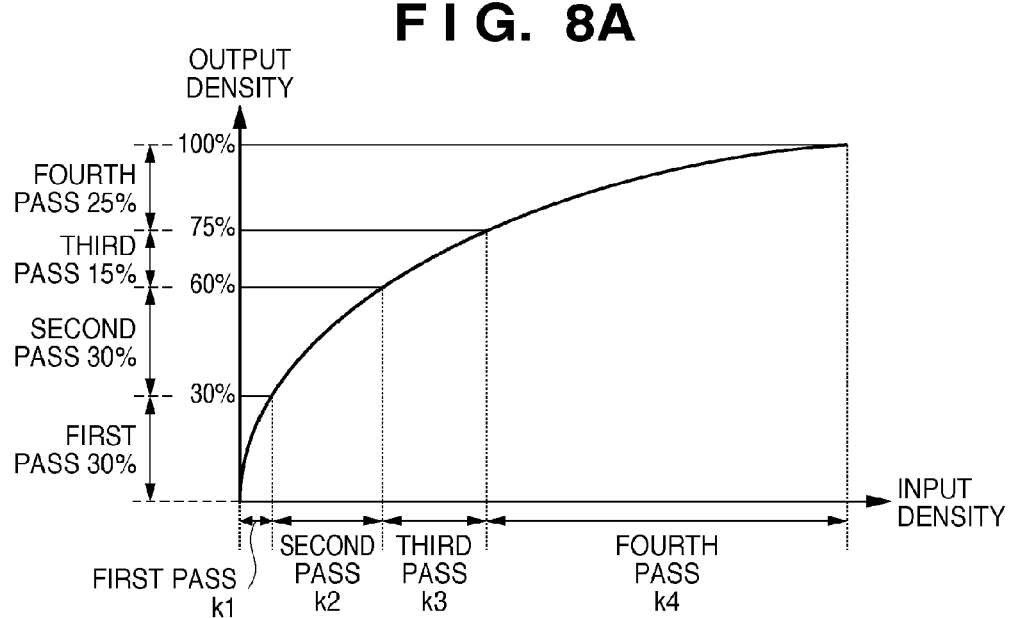
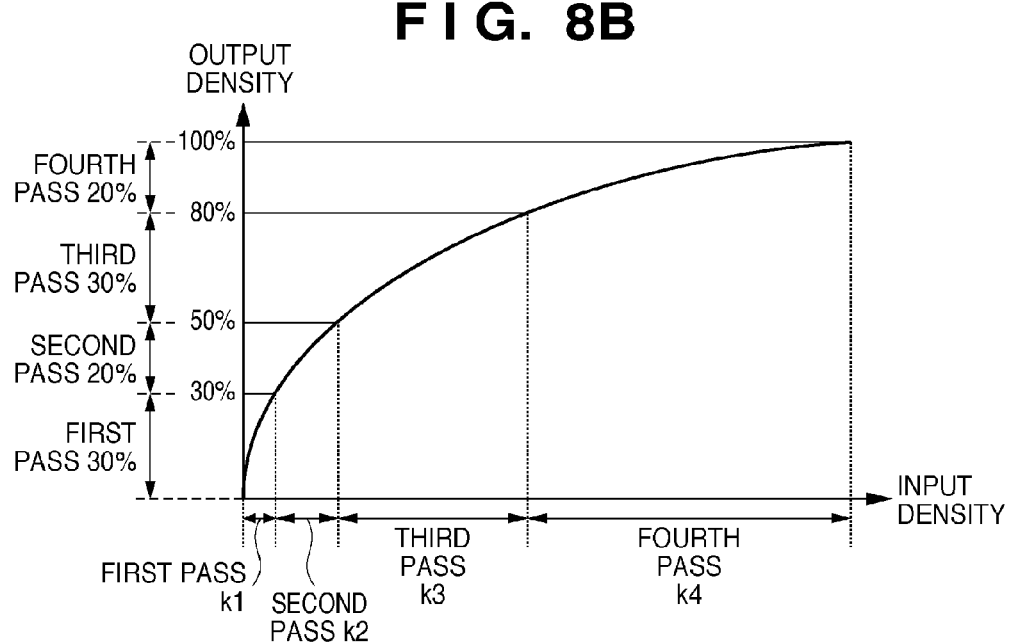

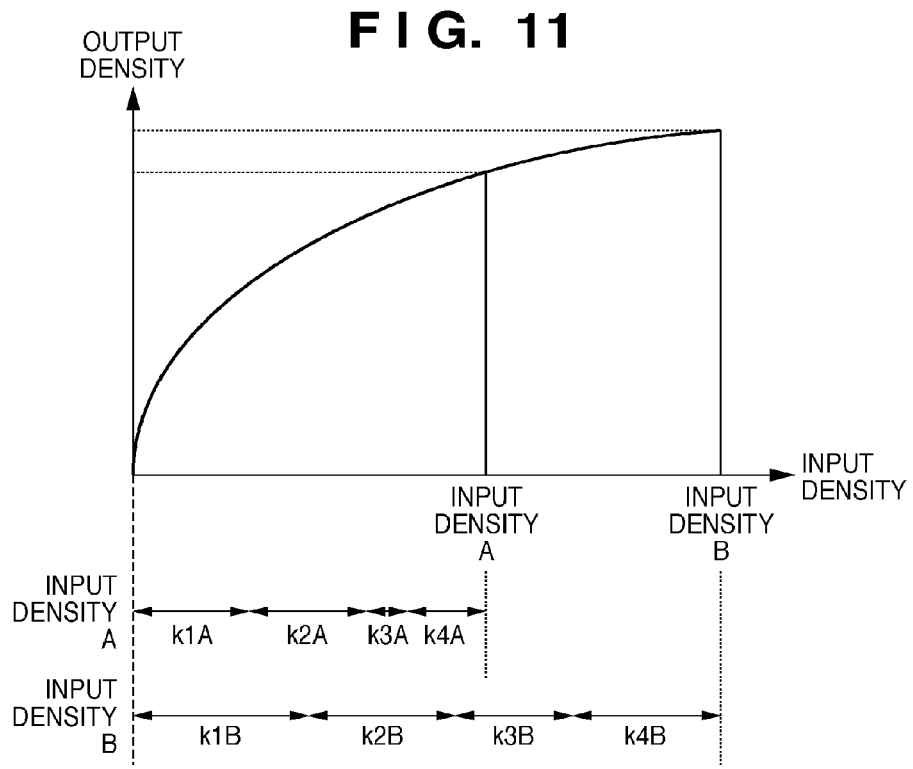

IMAGE FORMING APPARATUS AND IMAGE FORMING METHOD

This application is a continuation of application Ser. No. 12/420,436, filed Apr. 8, 2009, the entire disclosure of which is incorporated herein by reference.

BACKGROUND OF THE INVENTION

1. Field of the Invention

The present invention relates to an image forming technique of forming an image on a print medium.

2. Description of the Related Art

As a technique of correcting density nonuniformity, Japanese Patent Laid-Open No. 02-286341 (reference 1) discloses a technique of, when printing an image, detecting density nonuniformity of printing elements at a predetermined timing, and adjusting, based on the detection result, a driving signal to be supplied to a printhead.

Japanese Patent Laid-Open No. 2000-52571 (reference 2: U.S. Pat. No. 6,707,579) discloses a technique of detecting density nonuniformity of a test image formed by driving a printhead in accordance with binary image data for test, generating density nonuniformity correction data on the basis of the detection result, and correcting binary image data before forming an image.

However, the technique disclosed in reference 1 corrects image data when the number of print sheets reaches a predetermined value or the OFF period reaches a predetermined value. This technique cannot correct image data in real time.

The technique disclosed in reference 2 corrects binary image data before forming an image, and cannot correct density nonuniformity suddenly occurring when forming an image. For this reason, this technique cannot correct binary image data in real time.

SUMMARY OF THE INVENTION

The present invention enables to form a higher-quality image by correcting density nonuniformity in real time.

According to one aspect of the present invention, there is provided an image forming apparatus which forms a halftone image on a print medium using multipass processing of scanning a single area on the print medium by a printhead N (N is an integer of not less than 2) times and forming dots every scan operation, the apparatus comprises: setting unit configured to set a print density ratio of each scan operation; generator configured to generate print data of each scan operation; printing unit configured to print the halftone image on the print medium on the basis of the print data generated by the generator; and detector configured to detect a state of printing on the print medium by the printing unit, wherein the generator corrects the print data in synchronism with printing by the printing unit based on the print density ratio set by the setting unit and the printing state detected by the detector.

The present invention can form a higher-quality image by correcting density nonuniformity in real time.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5A is a view showing the arrangement of the carriage 210;

FIG. 5B is a view showing density nonuniformity correction passes;

FIGS. 6A and 6B are graphs showing the relationship between the input density and the output density;

FIGS. 7A and 7B are tables showing the relationship between the input density and the output density;

FIGS. 8A and 8B are graphs showing the relationship between the input density and the output density;

FIG. 11 is a graph showing the relationship between the input density and the output density in the fourth embodiment;

FIG. 12 is a table showing the division ratios of input densities A and B shown in FIG. 11;

DESCRIPTION OF THE EMBODIMENTS

Figure 1:
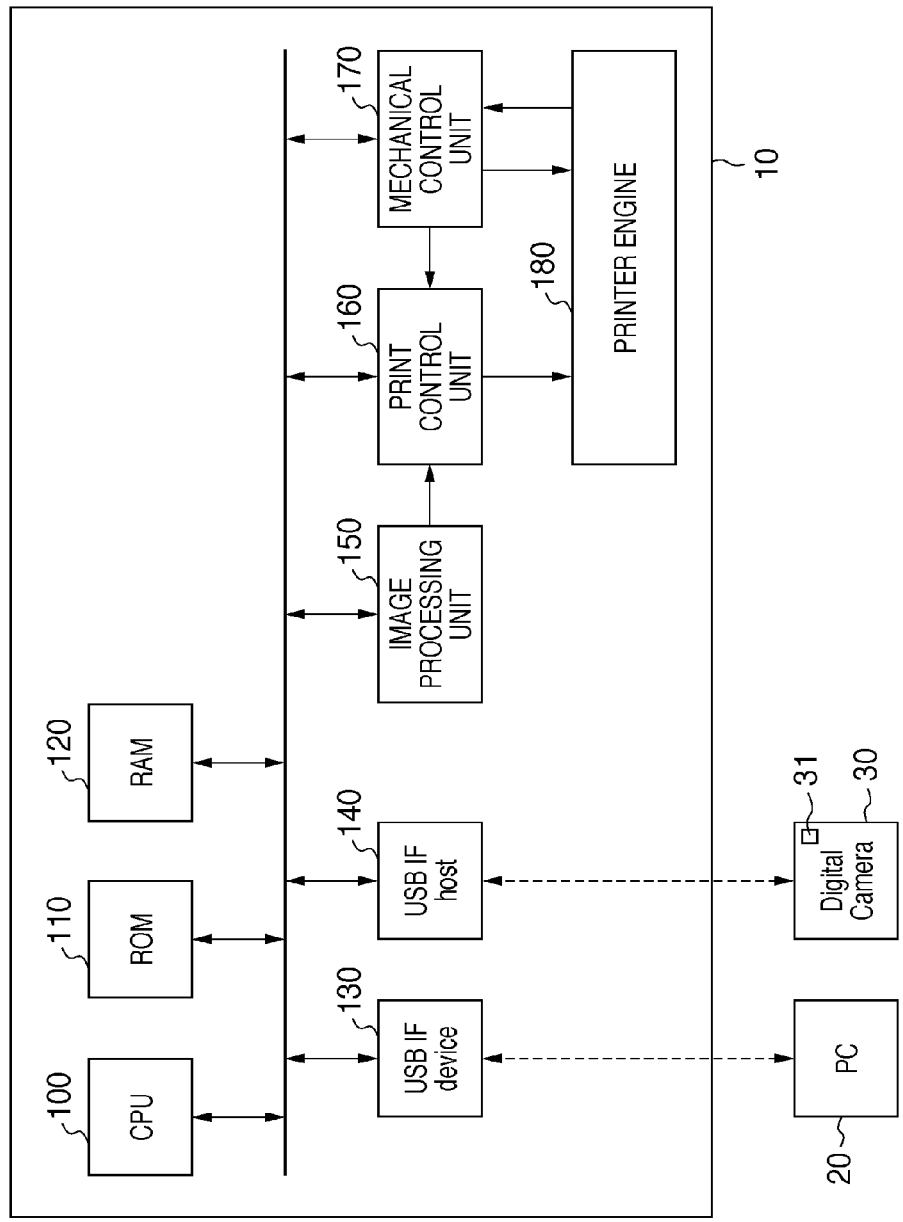
FIG. 1 is a block diagram showing the functional arrangement of a printer 10 according to the first embodiment.

A prior art and embodiments of the present invention will be explained in detail with reference to the accompanying drawings.

PRIOR ART

A known example of a conventional apparatus using a printhead having a plurality of printing elements is an inkjet printing apparatus using a printhead having a plurality of ink orifices. In the inkjet printing apparatus, the size and positions of dots formed with ink vary owing to variations in ink discharge amount, discharge direction, and the like. This leads to density nonuniformity in a printed image. Especially in a serial printing apparatus which prints by scanning an inkjet head in a direction different from the print medium setting direction (e.g., a direction perpendicular to a print medium), density nonuniformity caused by the above-mentioned variations appears and stands out as a streak in a printed image, degrading the quality of the printed image.

To correct the density nonuniformity, there has been proposed an inkjet printing method of discharging ink from different orifices to form a line of image data (dot pattern) having undergone halftone processing such as binarization processing. According to this method, 1-line image data can be complemented by a plurality of scan operations (or passes) by, for example, feeding a sheet by less than the printhead width. This method is generally called a multipass printing method.

The multipass printing method includes a method using a mask pattern, and a method of dividing the density of a multilevel input image to be printed for a plurality of scan operations and generating print data in accordance with the divided densities.

The method of performing pass division using a mask pattern divides generated print data for a plurality of print operations. For this purpose, a mask pattern corresponding to each pass is prepared in advance, and the mask pattern and generated print data are ANDed. The mask patterns are designed in advance to be able to print all generated data by a plurality of print operations. To achieve multipass division, the mask patterns are set such that printable dots are defined as 100%, printable dots are determined for each pass, dots are exclusive between passes, and the OR of printable dots in all passes equals the entire area. The mask patterns are selected to become as random as possible in order to avoid interference with halftone processing.

The present inventors have proposed a method of executing pass division by dividing the density of an input image to be printed in accordance with scanning. According to this method, the print density ratio of an input image to be printed is determined in correspondence with each scanning. The density of an input image to be printed is divided by a pass division coefficient determined in accordance with the print density ratio of each scanning. The resultant image undergoes halftone processing, generating print data. A typical density division sequence according to this method will be described below.

Figure 13:
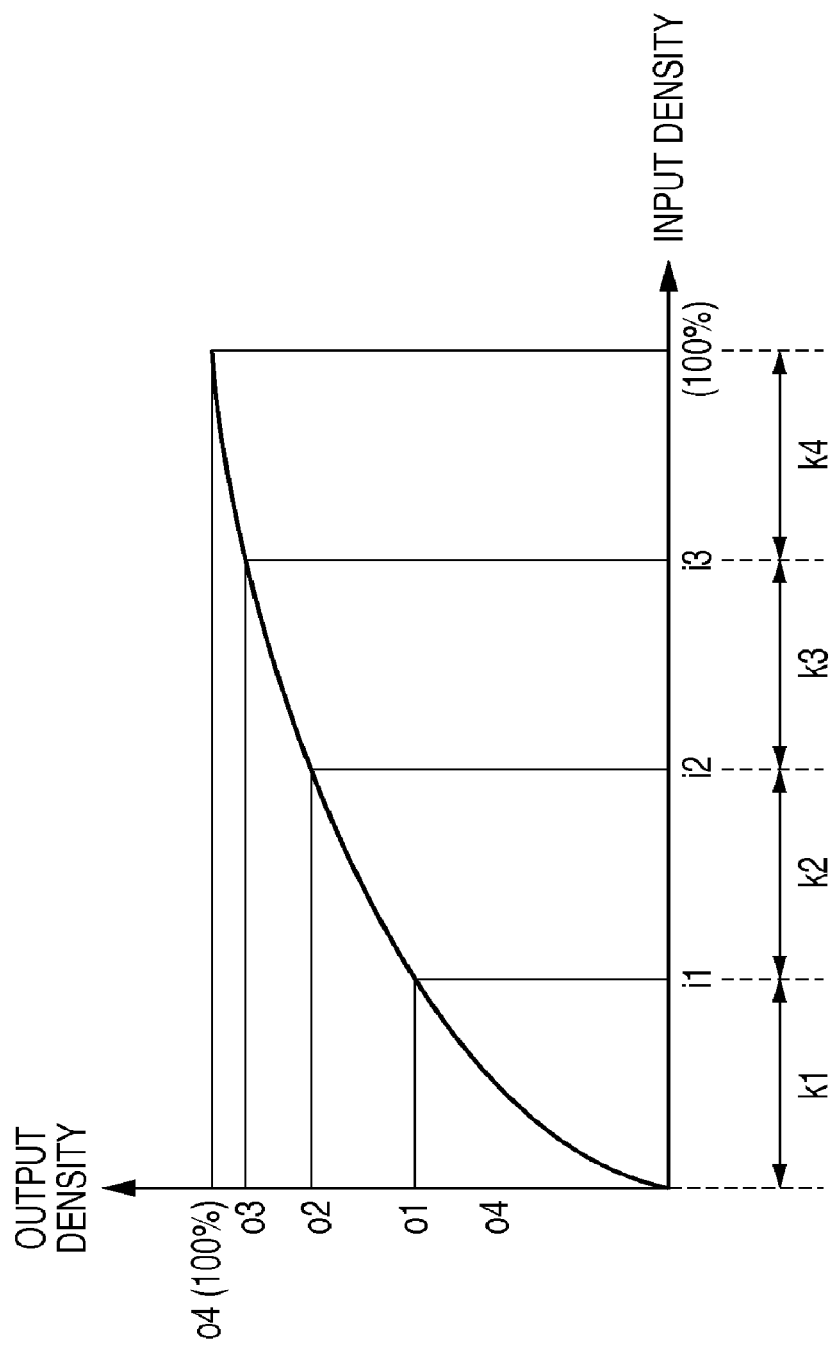
FIG. 13 is a graph showing a conventional sequence of dividing an input image into four passes.

FIG. 13 is a graph showing a conventional sequence of dividing an input image into four passes. The abscissa axis represents the density of an input image, and the ordinate axis represents the output density on a print medium. The output density with respect to the input density is not linear, and draws an upward curve in the positive direction along the ordinate axis. Basically, when dividing an input image into four passes, conventional density division equally divides input density data into four. More specifically, input density data is divided at input density division ratios k1, k2, k3, and k4 for the first to fourth passes=1:1:1:1, as shown in FIG. 13. Both of the mask pattern method and density division method print a target input image divisionally by a plurality of scan operations.

FIGS. 14A to 14D are views showing conventional multipass printing. FIGS. 14A to 14D exemplify four-pass printing of forming an image on a print medium 310 by scanning an inkjet head four times.

An inkjet head 300 is divided into four areas 300a, 300b, 300c, and 300d. In each area, a plurality of nozzles is arranged in the longitudinal direction. The area 300a is the bottom area of the inkjet head 300, and the area 300b is adjacent to the upper side of the area 300a. The area 300c is adjacent to the upper side of the area 300b, and the area 300d is adjacent to the upper side of the area 300c. As described above, the areas 300a to 300d are formed by equally dividing the area of the inkjet head 300 into four.

The printer repeats printing by moving the print medium 310 up with respect to the inkjet head 300 by a paper feed mechanism after the inkjet head 300 scans the print medium 310.

Figure 14A:
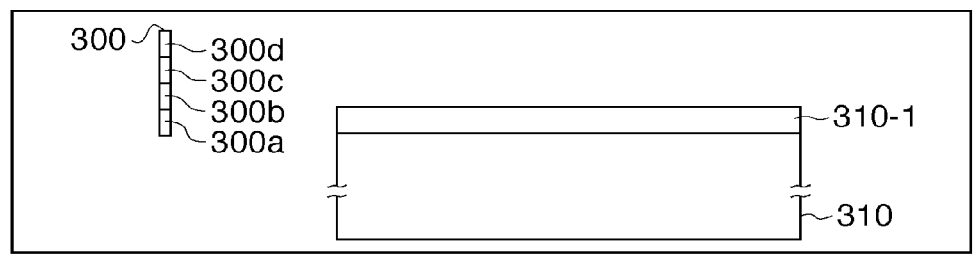
FIGS. 14A to 14D are views showing conventional multipass printing.

FIG. 14A shows scanning of an area 310-1 in the first pass. First, print data to be printed in the first pass out of print data to be printed in the area 310-1 of the print medium 310 is transmitted to the area 300a that is a lower ¼ area of the inkjet head 300. Then, the area 300a of the inkjet head 300 scans left (or right) the print medium 310. Printing in the first pass is done in the area 310-1 of the print medium 310 using nozzles arranged in the area 300a. In printing in the first pass, neither print data is transmitted to the areas 300b, 300c, and 300d of the inkjet head 300, nor printing is done in corresponding areas of the print medium 310.

After the end of the print processing, the print medium 310 is fed by a ¼ length (i.e., the width of the area 300a in the nozzle array direction) of the inkjet head 300.

Figure 14B:
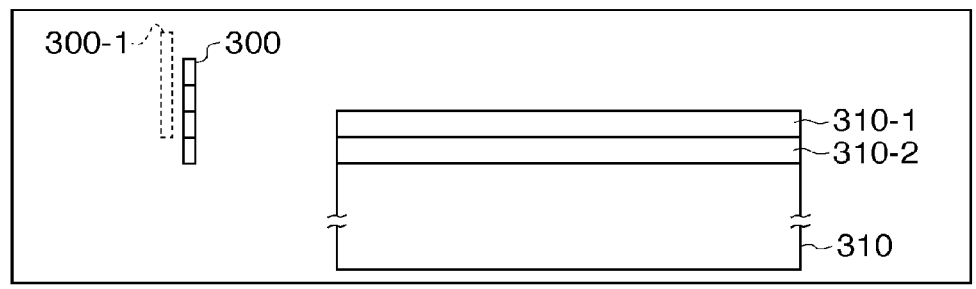

FIG. 14B shows scanning of the area 310-1 in the second pass. In scanning of the area 310-1 in the second pass, the inkjet head 300 resides at a position indicated by a solid line with respect to the print medium 310. In scanning in the first pass immediately preceding the second pass, the inkjet head 300 resided at a position 300-1 indicated by a broken line with respect to the print medium 310.

First, print data to be printed in the first pass out of print data to be printed in an area 310-2 of the print medium 310 is transmitted to the area 300a of the inkjet head 300. Then, the area 300a of the inkjet head 300 scans left (or right) the area 310-2 of the print medium 310. Printing in the first pass is done in the area 310-2 of the print medium 310 using nozzles arranged in the area 300a.

Also, print data to be printed in the second pass out of print data to be printed in the area 310-1 of the print medium 310 is transmitted to the area 300b of the inkjet head 300. The area 300b of the inkjet head 300 scans left (or right) the area 310-1 of the print medium 310. Printing in the second pass is done in the area 310-1 of the print medium 310 using nozzles arranged in the area 300b. Since the areas 300c and 300d of the inkjet head 300 have not reached the print area yet, neither print data is transmitted, nor printing is done in corresponding areas of the print medium 310.

After the end of the print processing, the print medium 310 is fed by a ¼ length (i.e., the width of the area 300a in the nozzle array direction) of the inkjet head 300.

Figure 14C:
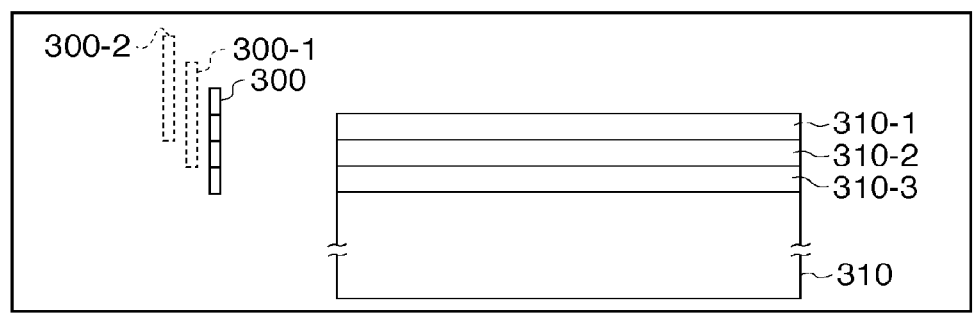

FIG. 14C shows scanning of the area 310-1 in the third pass. In scanning of the area 310-1 in the third pass, the inkjet head 300 resides at a position indicated by a solid line with respect to the print medium 310. In scanning in the second pass immediately preceding the third pass, the inkjet head 300 resided at the position 300-1 indicated by a broken line with respect to the print medium 310. In scanning in the first pass preceding the third pass by two, the inkjet head 300 resided at a position 300-2 indicated by a broken line with respect to the print medium 310.

First, print data to be printed in the first pass out of print data to be printed in an area 310-3 of the print medium 310 is transmitted to the area 300a of the inkjet head 300. Then, the area 300a of the inkjet head 300 scans left (or right) the area 310-3 of the print medium 310. Printing in the first pass is done in the area 310-3 of the print medium 310 using nozzles arranged in the area 300a.

Also, print data to be printed in the second pass out of print data to be printed in the area 310-2 of the print medium 310 is transmitted to the area 300b of the inkjet head 300. The area 300b of the inkjet head 300 scans left (or right) the area 310-2 of the print medium 310. Printing in the second pass is done in the area 310-2 of the print medium 310 using nozzles arranged in the area 300b.

Further, print data to be printed in the third pass out of print data to be printed in the area 310-1 of the print medium 310 is transmitted to the area 300c of the inkjet head 300. The area 300c of the inkjet head 300 scans left (or right) the area 310-1 of the print medium 310. Printing in the third pass is done in the area 310-1 of the print medium 310 using nozzles arranged in the area 300c. Since the area 300d of the inkjet head 300 has not reached the print area yet, neither print data is transmitted, nor printing is done in a corresponding area of the print medium 310.

After the end of the print processing, the print medium 310 is fed by a ¼ length (i.e., the width of the area 300a in the nozzle array direction) of the inkjet head 300.

Figure 14D:
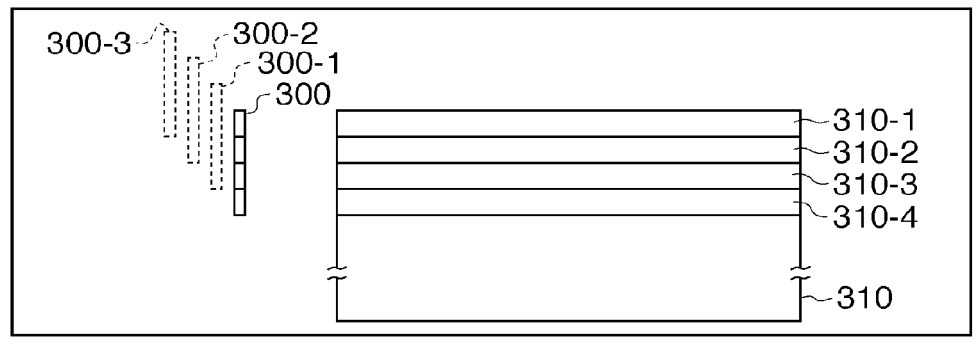

FIG. 14D shows scanning of the area 310-1 in the fourth pass. In scanning of the area 310-1 in the fourth pass, the inkjet head 300 resides at a position indicated by a solid line with respect to the print medium 310. In scanning in the third pass immediately preceding the fourth pass, the inkjet head 300 resided at the position 300-1 indicated by a broken line with respect to the print medium 310. In scanning in the second pass preceding the fourth pass by two, the inkjet head 300 resided at the position 300-2 indicated by a broken line with respect to the print medium 310. In scanning in the first pass preceding the fourth pass by three, the inkjet head 300 resided at a position 300-3 indicated by a broken line with respect to the print medium 310.

First, print data to be printed in the first pass out of print data to be printed in an area 310-4 of the print medium 310 is transmitted to the area 300a of the inkjet head 300. Then, the area 300a of the inkjet head 300 scans left (or right) the area 310-4 of the print medium 310. Printing in the first pass is done in the area 310-4 of the print medium 310 using nozzles arranged in the area 300a.

Also, print data to be printed in the second pass out of print data to be printed in the area 310-3 of the print medium 310 is transmitted to the area 300b of the inkjet head 300. The area 300b of the inkjet head 300 scans left (or right) the area 310-3 of the print medium 310. Printing in the second pass is done in the area 310-3 of the print medium 310 using nozzles arranged in the area 300b.

Print data to be printed in the third pass out of print data to be printed in the area 310-2 of the print medium 310 is transmitted to the area 300c of the inkjet head 300. The area 300c of the inkjet head 300 scans left (or right) the area 310-2 of the print medium 310. Printing in the third pass is done in the area 310-2 of the print medium 310 using nozzles arranged in the area 300c.

Further, print data to be printed in the fourth pass out of print data to be printed in the area 310-1 of the print medium 310 is transmitted to the area 300d of the inkjet head 300. The area 300d of the inkjet head 300 scans left (or right) the area 310-1 of the print medium 310. Printing in the fourth pass is done in the area 310-1 of the print medium 310 using nozzles arranged in the area 300d.

After the end of the print processing, the areas 300a, 300b, 300c, and 300d of the inkjet head 300 have executed print processes in the first, second, third, and fourth passes, completing the entire image formation in the area 310-1.

After the end of scanning the area 310-1 in the fourth pass, the print medium 310 is fed by a ¼ length (i.e., the width of the area 300a in the nozzle array direction) of the inkjet head 300. Then, printing by scanning the inkjet head 300, and paper feed are sequentially repeated to form an image on the print medium 310.

In this way, the conventional multipass printing method divides the area on a print medium for a plurality of scan operations, divides print data for the respective scan operations, and prints the divided print data, in order to reduce density nonuniformity such as a streak arising from a mechanical paper feed error or variations in the nozzles of the inkjet head.

First Embodiment

An image forming apparatus according to the first embodiment forms a halftone image on a print medium using multipass processing. In the multipass processing, the printhead scans a single area on a print medium N (N is an integer of 2 or more) times, forming dots every scan operation.

More specifically, the image forming apparatus includes a print density ratio setting unit which sets the print density ratio of each scan operation, a print data generation unit which generates print data for each scan operation, and a printing unit which prints a halftone image on a print medium on the basis of print data generated by the print data generation unit. The image forming apparatus further includes a detection unit which detects the state of printing on a print medium by the printing unit. These units of the image forming apparatus can be implemented by the following arrangement.

FIG. 1 is a block diagram showing the functional arrangement of a printer 10 according to the first embodiment of the present invention.

In the first embodiment, the printer 10 is an inkjet printer. The printer 10 includes a CPU (Central Processing Unit) 100, ROM 110, RAM 120, USB device interface (I/F) 130, and USB host interface (I/F) 140. The printer 10 also includes an image processing unit 150, print control unit 160, mechanical control unit 170, and printer engine 180.

The CPU 100 controls the printer 10. The ROM 110 stores programs and table data for the CPU 100. The RAM 120 is a memory for storing variables and data.

The USB device interface 130 receives data from a personal computer (PC) 20. The USB host interface 140 receives data from an electronic device such as a digital camera 30. In the first embodiment, the personal computer 20 is connected to the USB device interface 130 while the digital camera 30 is connected to the USB host interface 140.

The image processing unit 150 performs processes such as color conversion and binarization for a multilevel image input from an electronic device such as the digital camera 30. The print control unit 160 executes print control by transmitting print data having undergone binarization processing by the image processing unit 150 to the printer engine 180. The printer engine 180 has a head, paper feed mechanism, carriage feed mechanism, and the like. The mechanical control unit 170 controls the mechanical part (e.g., the rotational speed of the motor) of the printer engine 180 such as the paper feed mechanism and carriage feed mechanism.

Assume that an image sensed by the digital camera 30 is to be directly transmitted to the printer 10 and printed without the mediacy of the personal computer 20. First, a sensor (not shown) reads information (e.g., the type of print medium) of a print medium (not shown) set in the printer engine 180. Then, the CPU 100 determines the type of print medium.

A variety of sensors for detecting the type of print medium have been proposed. An example of such sensor emits light of a specific wavelength to a print medium, and reads the reflected light. The sensor compares the reflected light with a plurality of wavelength samples stored in advance, thereby determining the print medium.

Image data sensed by the digital camera 30 is stored as a JPEG image in an internal memory 31 of the digital camera 30. The digital camera 30 is connected to the USB host interface 140 of the printer 10 via a connection cable. The sensed image stored in the memory 31 of the digital camera 30 is temporarily stored in the RAM 120 of the printer 10 via the USB host interface 140. The image data received from the digital camera 30 is a JPEG image. The compressed image is decompressed into image data using the CPU 100, and the image data is stored in the RAM 120. Based on the image data stored in the RAM 120, print data to be printed by the inkjet head of the printer engine 180 is generated. The image processing unit 150 executes color conversion processing, binarization processing, and the like for the image data stored in the RAM 120, converting the image data into print data (dot data) to be printed. Further, pass division is executed to make the print data cope with multipass printing. Details of the processes in the image processing unit 150 will be described later.

The pass-divided print data are transmitted to the print control unit 160, and then transmitted to the inkjet head of the printer engine 180 in the inkjet head driving order. The print control unit 160 generates discharge pulses in synchronism with the mechanical control unit 170 and printer engine 180. Ink droplets are discharged, forming an image on a print medium (not shown).

In the first embodiment, the image processing unit 150 performs binarization processing. However, the processing is not limited to binarization as long as an input image can be quantized for printing. For example, the processing includes N-ary (N is an integer of 2 or more) processing for data amount reduction in a case wherein the number of ink densities, ink droplet sizes, or the like is not two but three.

In the first embodiment, the sensor (not shown) arranged in the printer engine 180 detects a print medium, and the CPU 100 determines the type of print medium set in the printer 10. Alternatively, the user may also select the type of print medium by manipulating the printer 10 or digital camera 30.

Figure 2:
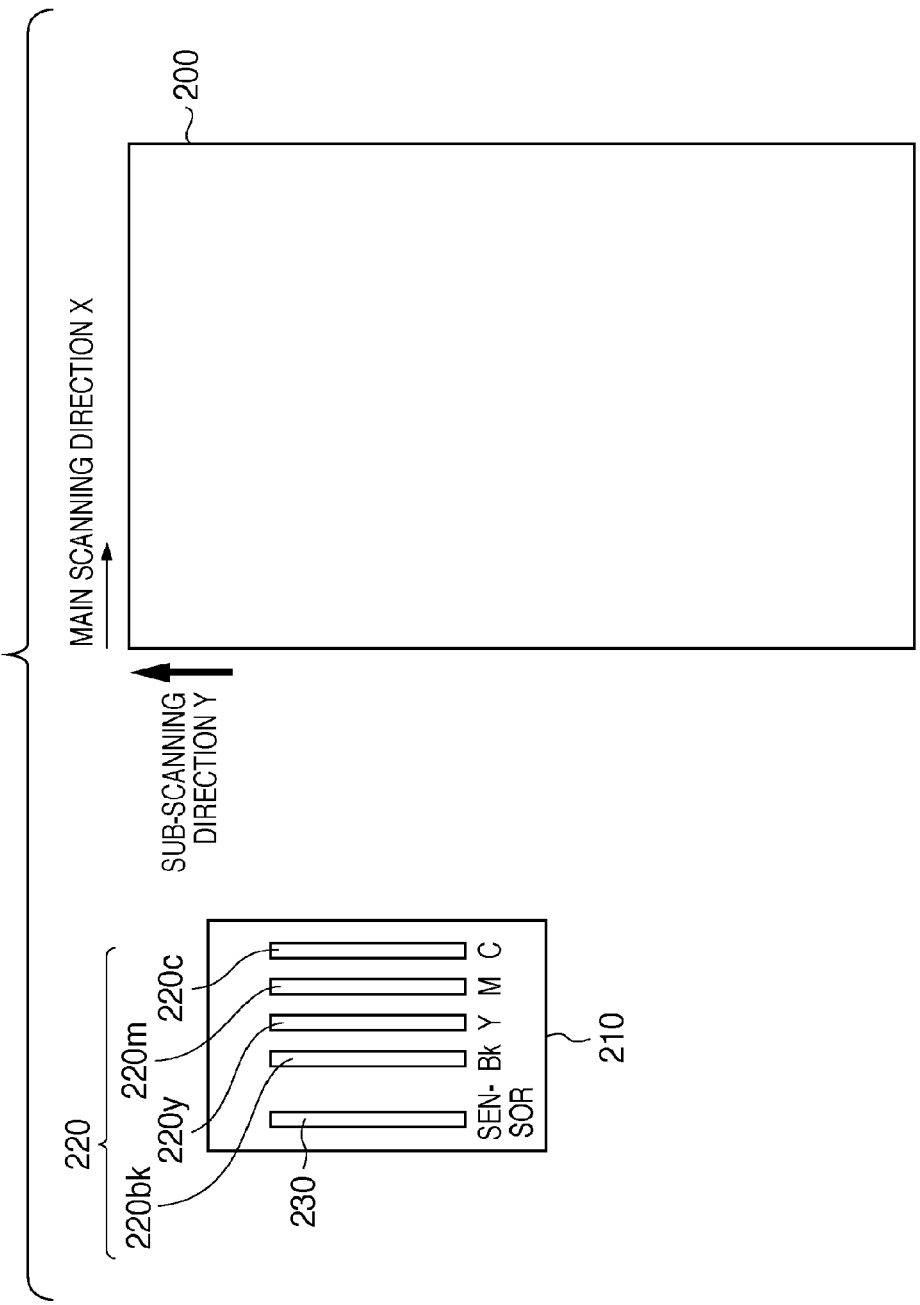
FIG. 2 is a view showing the arrangement of a print medium 200 and carriage 210.

FIG. 2 is a view showing the arrangement of a print medium 200 and carriage 210. The carriage 210 supports an inkjet head 220 and sensor 230, and can scan both right and left.

The inkjet head 220 includes four color heads: a cyan head 220c, magenta head 220m, yellow head 220y, and black head 220bk. The inkjet head 220 includes a plurality of discharge nozzles for each color. The sensor 230 is a color sensor which detects an RGB printing state on the print medium 200. That is, the sensor 230 functions as a detection unit which detects a printing state on a print medium. The sensor 230 is arranged adjacent to the left side (or right side) of the color inkjet head 220. The first embodiment employs a color sensor which detects an RGB printing state. Instead, a CMY complementary color sensor, monochrome sensor, or the like is also available.

The carriage 210 prints by discharging ink droplets from the discharge nozzles of the color inkjet head 220 while scanning the print medium 200. When printing by one scanning ends, the printer engine 180 (see FIG. 1) conveys the print medium 200 in the sub-scanning direction Y and sets it at the next scan position.

The first embodiment executes multipass printing to print by scanning a print area a plurality of number of times. For this reason, the amount of print medium 200 conveyed at a time is smaller than the nozzle width of the inkjet head 220. In the first embodiment, the print medium 200 is conveyed by a ¼ nozzle width of the inkjet head 220 every scanning of the carriage 210.

When the main scanning direction X is the right, the sensor 230 is positioned upstream of the inkjet head 220. The sensor 230 can detect a printing state on the print medium 200 during scanning of the carriage 210. The printing state is the state of actual printing on the print medium 200 that changes depending on the discharge characteristics (variations in ink discharge amount and discharge direction) of the inkjet head 220 and variations in the conveyance amount of the print medium 200 by the printer engine 180 (see FIG. 1). Thus, density nonuniformity can be corrected in real time on the basis of the detection result, details of which will be described later.

When the main scanning direction X is the left, the sensor 230 is positioned downstream of the inkjet head 220. When print data is generated for the current pass (nth pass), the sensor 230 cannot detect the printing state of up to the (n−1)th pass. Hence, no density nonuniformity can be corrected in real time during scanning. However, when the detection result of the sensor 230 is held for one scanning, density nonuniformity can be corrected.

FIG. 5A is a view showing the arrangement of the carriage 210. FIG. 5B is a view showing density nonuniformity correction passes.

As shown in FIG. 5A, the carriage 210 supports the inkjet head 220 and sensor 230. The carriage 210 can move both right (direction A) and left (direction B) with respect to a print medium. That is, the first embodiment assumes multipass printing of printing in two directions (both right and left) by four scan operations.

The sensor 230 is arranged on only the left side of the inkjet head 220, and detects a printing state on a print medium. More specifically, in the first embodiment, the sensor 230 is positioned downstream of the inkjet head 220 in the main scanning direction A (state in which the sensor 230 cannot sense a printing state before printing), and upstream of the inkjet head 220 in the main scanning direction B (state in which the sensor 230 can sense a printing state before printing). The sensor 230 has about the ¼ length of the inkjet head 220 in the nozzle array direction.

Referring to FIG. 5B, FIGS. "1", "2", "3", and "4" in squares represent pass (scan) numbers for each line. Minimum units (a, b, c, . . . ) along the ordinate axis are equally divided in the first embodiment, so the minimum unit corresponds to a value obtained by dividing the length of the inkjet head 220 by the number of passes. The minimum unit coincides with the conveyance amount of a print medium in the sub-scanning direction Y in multipass printing. A minimum unit (A1, B1, . . . ) along the abscissa axis represents an image print process of the inkjet head 220 per scanning in the main scanning direction. The ordinate axis represents the print medium while the abscissa axis represents the print process per scanning.

The abscissa axis will be explained first. A1 represents a line (line a in the first embodiment) printed by the first scanning of the inkjet head 220 in the direction A. B1 represents a line (line a in the second pass and line b in the first pass in the first embodiment) printed by the first scanning in the direction B after scanning of A1 ends and the print medium is conveyed in the sub-scanning direction Y. Similarly, A2 represents a line (line a in the third pass, line b in the second pass, and line c in the first pass in the first embodiment) printed by the second scanning in the direction A after scanning of B1 ends and the print medium is conveyed in the sub-scanning direction Y.

Then, the ordinate axis will be explained. For example, for a line c, the second scanning (A2) in the direction A corresponds to the first pass, and the second scanning (B2) in the direction B corresponds to the second pass. Further, for the line c, the third scanning (A3) in the direction A corresponds to the third pass, and the third scanning (B3) in the direction B corresponds to the fourth pass. In this manner, the ordinate axis represents that multipass printing is executed by four scan operations. In FIG. 5B, hatched squares mean passes in which density nonuniformity can be corrected in real time on the basis of the detection result of the printing state of up to the (n−1)th pass (n represents the current pass) that has been detected by the sensor 230. A scanning direction in which the sensor 230 is positioned upstream of the inkjet head 220 is only the direction B. This means that density nonuniformity can be corrected in the second to fourth passes in only the scan operations B1, B2, B3, B4, B5, and B6. The sensor 230 has a length enough to detect the printing state of pixels of all three passes up to the (n−1)th pass (n represents the current pass) in scanning in the direction B.

This will be explained by referring to lines along the ordinate axis. Density nonuniformity on lines a, c, e, g, and i can be corrected in the second and fourth passes, and that on lines b, d, f, and h can be corrected in only the third pass. From this, the pass capable of correcting density nonuniformity differs between lines.

In bidirectional multipass printing, when the sensor 230 is arranged on only one side of the inkjet head 220, no density nonuniformity need be corrected in all passes, and the pass for correcting density nonuniformity differs between even- and odd-numbered lines.

A method of effectively correcting density nonuniformity while compensating for the difference between passes and variations between lines when the sensor is arranged on only one side in bidirectional multipass printing will be explained.

FIGS. 6A and 6B are graphs showing the relationship between the input density and the output density. FIG. 6A shows an example of density division when density nonuniformity is corrected in the second and fourth passes, like lines a, c, e, g, and i shown in FIG. 5B. In this case, the density division ratios of the second and fourth passes for correcting density nonuniformity are set higher than that of the third pass. To the contrary, FIG. 6B shows an example of density division when density nonuniformity can be corrected in only the third pass, like lines b, d, f, and h shown in FIG. 5B. In this case, the density division ratio of the third pass capable of correcting density nonuniformity is set higher than those of the second and fourth passes. That is, the print data generation unit sets a higher print density ratio in scanning in which density nonuniformity is corrected than that in scanning in which no density nonuniformity is corrected.

As described above, the density division ratio of a pass in which density nonuniformity is corrected is set higher than that of a pass in which no density nonuniformity is corrected. With this setting, density nonuniformity can be effectively corrected while the sensor is arranged on only one side. Reducing the number of sensors can minimize the increase in cost.

Figure 3:
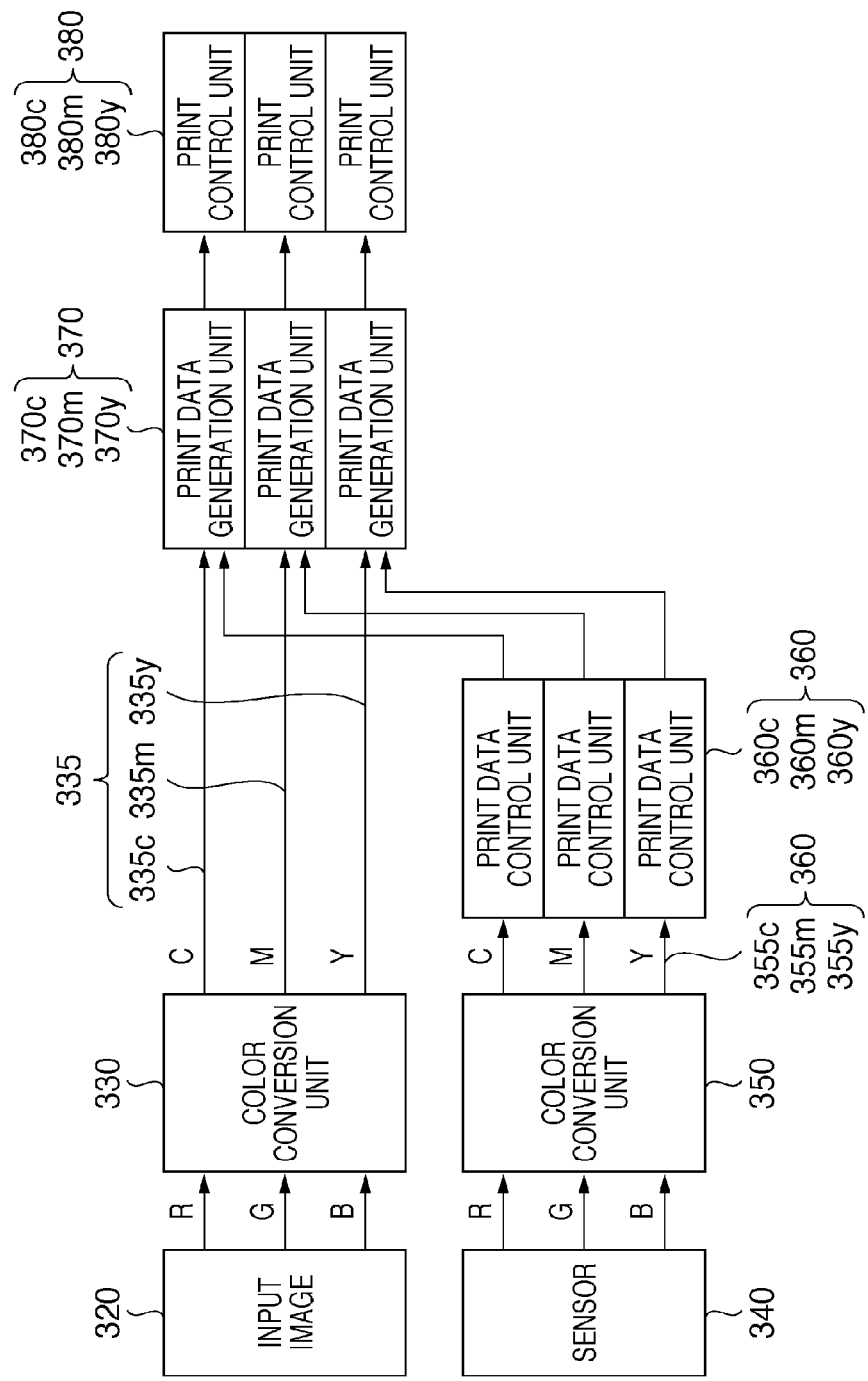
FIG. 3 is a block diagram showing the functional arrangement of an image forming apparatus according to the first embodiment.

FIG. 3 is a block diagram showing the functional arrangement of the image forming apparatus according to the first embodiment. A color conversion unit 330 converts an input image 320 from R, G, and B signals into C, M, and Y signals 335 including a cyan signal 335c, magenta signal 335m, and yellow signal 335y for printing by the inkjet printer. R, G, and B signals detected by a sensor 340 for detecting a printing state are converted by a color conversion unit 350 into C, M, and Y signals 355 including a cyan signal 355c, magenta signal 355m, and yellow signal 355y. The converted C, M, and Y signals 355 are input to a cyan print data control unit 360c, magenta print data control unit 360m, and yellow print data control unit 360y of a print data control unit 360 for the respective colors.

The color conversion unit 350 executes color conversion into the C, M, and Y signals 355 on the basis of the color filter characteristics of the sensor 340 with respect to R, G, and B signals, the characteristic of a light source with respect to the detection area of the sensor 340, the characteristics of print inks, and the like.

The print data control unit 360 for the respective colors controls generation of print data on the basis of the C, M, and Y signals 355 obtained by the color conversion unit 350 from R, G, and B signals detected by the sensor 340. The print data control unit 360 performs correction of the density level from the sensor 340, generation of control data, and the like.

The C, M, and Y signals 335 color-converted from the input image 320 are input to a print data generation unit 370 for the respective colors, together with signals obtained when the print data control unit 360 controls the C, M, and Y signals 355 converted by the color conversion unit 350 upon detected by the sensor 340.

The print data generation unit 370 formed from a cyan print data generation unit 370c, magenta print data generation unit 370m, and yellow print data generation unit 370y generates print data by binarization for printing by the inkjet head. At this time, the cyan, magenta, and yellow print data generation units 370c, 370m, and 370y of the print data generation unit 370 are controlled by print data output from the print data control unit 360. Details of the print data generation unit 370 will be described later.

Print data for the inkjet head are generated by the print data generation unit 370, and then input to a cyan print control unit 380c, magenta print control unit 380m, and yellow print control unit 380y of a print control unit 380 for the respective colors. Based on the tone-reduced print data, the print control unit 380 performs print control for the printer engine 180 (see FIG. 1) including the inkjet head, thereby forming an image on a print medium.

Figure 4:
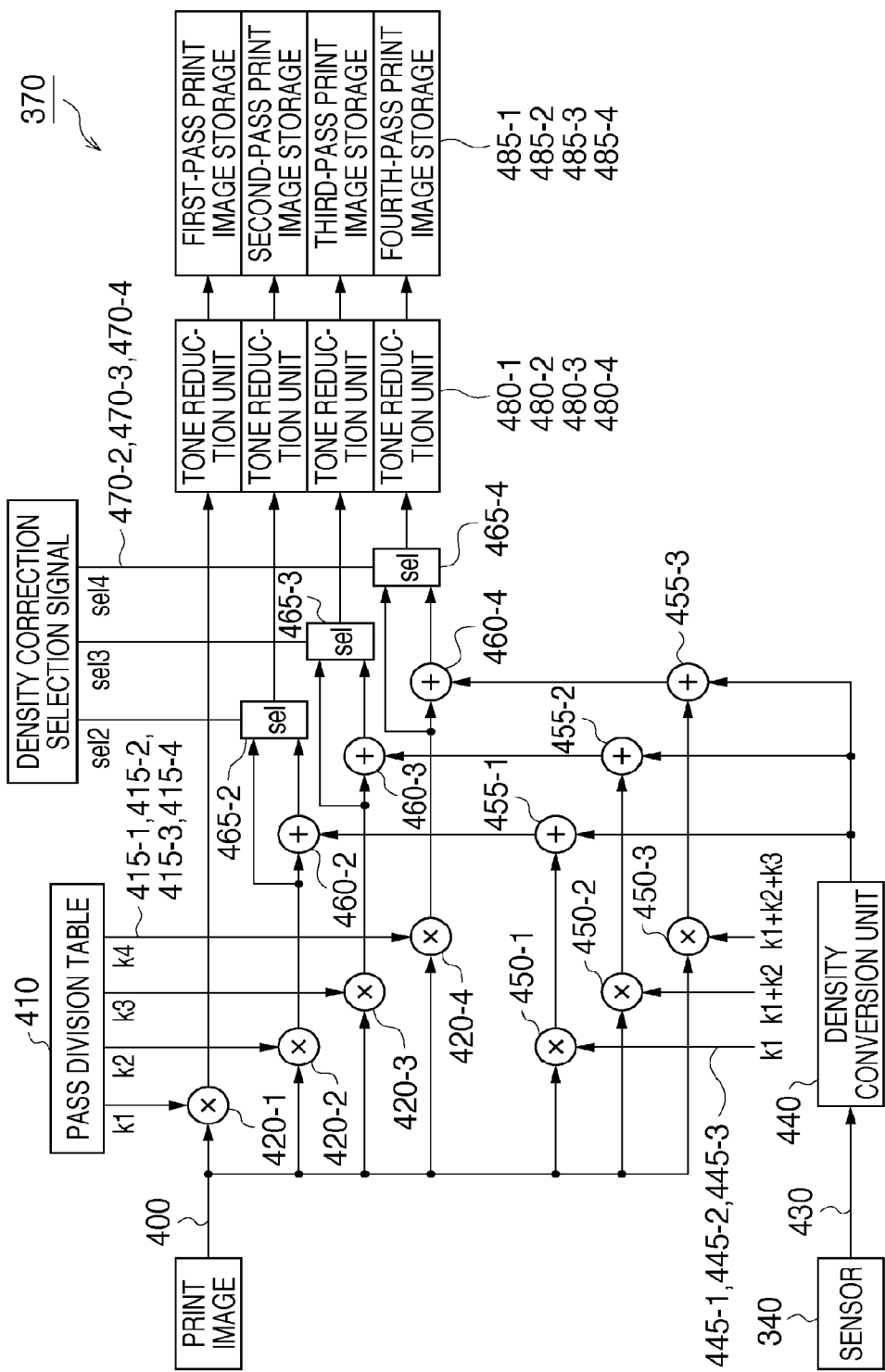
FIG. 4 is a block diagram showing the functional arrangement of a print data generation unit 370 according to the first embodiment.

FIG. 4 is a block diagram showing the functional arrangement of the print data generation unit 370 according to the first embodiment. FIG. 4 exemplifies the functional arrangement of one of the cyan print data generation unit 370c, magenta print data generation unit 370m, and yellow print data generation unit 370y in the print data generation unit 370 shown in FIG. 3. The color conversion unit 330 in FIG. 3 converts a print image signal 400 (corresponding to the C, M, or Y signal 335 in FIG. 3) representing a print image into each ink color for printing.

A pass division table 410 stores division ratios k1, k2, k3, and k4 for multipass division. A multiplier 420-1 calculates the print density of the first pass by multiplying the print image signal 400 by a division ratio k1 415-1 of the first pass. A multiplier 420-2 calculates the print density of the second pass by multiplying the print image signal 400 by a division ratio k2 415-2 of the second pass. A multiplier 420-3 calculates the print density of the third pass by multiplying the print image signal 400 by a division ratio k3 415-3 of the third pass. A multiplier 420-4 calculates the print density of the fourth pass by multiplying the print image signal 400 by a division ratio k4 415-4 of the fourth pass.

A signal 430 is input from the sensor 340 to a density conversion unit 440. As shown in FIG. 3, the signal 430 is obtained by converting an R, G, or B signal output from the sensor 340 into the C, M, or Y signal 355 by the color conversion unit 350. The density conversion unit 440 converts the signal 430 corresponding to the C, M, or Y signal 355 shown in FIG. 3 into a print density.

A multiplier 450-1 calculates the print density of the first pass by multiplying the print image signal 400 by the division ratio k1 of the first pass. A multiplier 450-2 calculates the sum of the print densities of the first and second passes by multiplying the print image signal 400 by the sum (k1+k2) of the division ratio k1 of the first pass and the division ratio k2 of the second pass. A multiplier 450-3 calculates the sum of the print densities of the first to third passes by multiplying the print image signal 400 by the sum (k1+k2+k3) of the division ratio k1 of the first pass, the division ratio k2 of the second pass, and the division ratio k3 of the third pass.

The print densities calculated by the multipliers 450-1 to 450-3 are input to adders 455-1 to 455-3. The adder 455-1 calculates the difference between the print density of the first pass and a print density detected by the sensor 340. The adder 455-2 calculates the difference between the sum of the print densities of the first and second passes and the print density detected by the sensor 340. The adder 455-3 calculates the difference between the sum of the print densities of the first to third passes and the print density detected by the sensor 340.

The print densities calculated by the adders 455-1 to 455-3 are input to adders 460-2 to 460-4. The adder 460-2 adds the print density of the second pass and the difference, calculated by the adder 455-1, between the print density of the first pass and the print density detected by the sensor 340. The adder 460-3 adds the print density of the third pass and the difference, calculated by the adder 455-2, between the sum of the print densities of the first and second passes and the print density detected by the sensor 340. The adder 460-4 adds the print density of the fourth pass and the difference, calculated by the adder 455-3, between the sum of the print densities of the first to third passes and the print density detected by the sensor 340.

A selector 465-2 selects either of an output from the adder 460-2 that has undergone density correction, and an output from the multiplier 420-2 that has been multiplied by the print density ratio. A selector 465-3 selects either of an output from the adder 460-3 that has undergone density correction, and an output from the multiplier 420-3 that has been multiplied by the print density ratio. A selector 465-4 selects either of an output from the adder 460-4 that has undergone density correction, and an output from the multiplier 420-4 that has been multiplied by the print density ratio.

A density correction selection signal 470-2 controls the selector 465-2. A density correction selection signal 470-3 controls the selector 465-3. A density correction selection signal 470-4 controls the selector 465-4.

A tone reduction unit 480-1 generates print data of the first pass from an output from the multiplier 420-1 which has calculated the print density of the first pass. A tone reduction unit 480-2 generates print data of the second pass from an output from the selector 465-2 which has calculated the print density of the second pass. A tone reduction unit 480-3 generates print data of the third pass from an output from the selector 465-3 which has calculated the print density of the third pass. A tone reduction unit 480-4 generates print data of the fourth pass from an output from the selector 465-4 which has calculated the print density of the fourth pass.

A first-pass print image storage 485-1 temporarily stores, as a print image of the first pass, an output from the tone reduction unit 480-1 which has generated print data of the first pass. A second-pass print image storage 485-2 temporarily stores, as a print image of the second pass, an output from the tone reduction unit 480-2 which has generated print data of the second pass. A third-pass print image storage 485-3 temporarily stores, as a print image of the third pass, an output from the tone reduction unit 480-3 which has generated print data of the third pass. A fourth-pass print image storage 485-4 temporarily stores, as a print image of the fourth pass, an output from the tone reduction unit 480-4 which has generated print data of the fourth pass.

In the first embodiment, the sensor 340 detects the printing state of up to the (n−1)th pass (the nth pass represents the current scanning). The difference between the detected print density and a target print density for printing on a print medium is calculated to correct print data to be generated next. At this time, the density division ratios (k1 to k4) are controlled based on whether the sensor 340 can detect the printing state. More specifically, the print data generation unit corrects print data in synchronism with printing by the printing unit on the basis of a print density ratio set by the print density ratio setting unit and a printing state detected by the detection unit.

Even when the sensor 340 is arranged on only one side and no density nonuniformity can be corrected in all scan operations (i.e., density nonuniformity is corrected in some scan operations), density nonuniformity can be effectively corrected. Reducing the number of sensors leads to cost reduction.

The operation sequence of the print data generation unit 370 will be explained. Print image signals converted into respective ink colors are input to the multipliers 420-1 to 420-4 which calculate the print densities of respective scan operations. The multipliers 420-1 to 420-4 multiply the signals by the division ratios k1, k2, k3, and k4 read out from the pass division table 410, thereby determining the print densities of the respective passes.

When generating print data of the first pass, the multiplier 420-1 calculates the print density of the first pass, the tone reduction unit 480-1 generates print data, and the first-pass print image storage 485-1 stores the print data.

When generating print data of the second and subsequent passes, the multipliers 420-2 to 420-4 calculate the print densities of the respective passes. At the same time, the multipliers 420-2 to 420-4 calculate the target print density of up to the (n−1)th pass (the nth pass represents the current scanning). When printing in the second pass, the multiplier 420-2 calculates the target print density of the first pass. At the same time, the multiplier 450-1 multiplies the print image signal 400 of the first pass by the division ratio k1 of the first pass.

A detection signal for detecting a printing state by the sensor is color-converted into a C, M, or Y signal. The density conversion unit 440 converts the C, M, or Y signal into a detected density. To calculate a difference from the calculated target print density, the detected density of the first pass is input to the adder (subtracter) 455-1 together with an output from the multiplier 450-1. The adder 460-2 adds the print density of the second pass, and the difference between the detected density and the target density that has been calculated by the adder 455-1.

As shown in FIGS. 5A and 5B, when the sensor 230 is arranged on one side of the inkjet head 220, no density can be corrected in all passes. For this reason, the selector 465-2 is provided so that either of an output from the multiplier 420-2 and an output from the adder 460-2 which calculates a corrected print density can be selected as the division coefficient of a pass in which no density is corrected. The values of the density correction selection signals 470-2 to 470-4 for selecting either output are determined in accordance with whether the density can be corrected in the current pass. More specifically, when the density can be corrected in the current pass, a corrected print density from the adder 460-2 is used. When no density can be corrected in the current pass, a print density from the multiplier 420-2 is used.

Based on the calculated print density, the tone reduction unit 480-2 generates print data. The second-pass print image storage 485-2 stores the generated print data of the second pass as a print image of the second pass.

Similarly, when generating print data of the third pass, the multiplier 420-3 calculates the print density of the third pass. At the same time, the multiplier 450-2 calculates the target print densities of the first and second passes by multiplying the print image signal 400 by the sum (k1+k2) of the print division ratios of the first and second passes. The density conversion unit 440 converts a density detected after printing in the second pass from a printing state detected by the sensor. The adder 455-2 calculates the difference between the target print density after printing in the second pass that has been calculated by the multiplier 450-2, and the density detected by the sensor. The adder 460-3 adds the difference to the print density of the third pass.

However, when the sensor is arranged on one side of the head, no density can be corrected in all scan operations, as shown in FIGS. 5A and 5B. For this reason, the selector 465-3 is provided. The selector 465-3 can select whether to directly use an output multiplied by the multiplier 420-3 by a division coefficient for scanning in which no density is corrected, or whether to use an output from the adder 460-3 which calculates a corrected print density. The value of the density correction selection signal 470-3 for selecting either output is determined in accordance with whether the density can be corrected in the current pass. When the density can be corrected, a print density corrected by the adder 460-3 is used. When no density can be corrected, a print density output from the multiplier 420-3 is used. The tone reduction unit 480-3 generates print data on the basis of the print density of the third pass that has been corrected based on the difference between the target print density after printing in the second pass and the detected print density. The third-pass print image storage 485-3 stores the generated print data of the third pass as a print image of the third pass. The print density of the fourth pass is calculated similarly to those of the second and third passes.

The print density division coefficient needs to be controlled to change the coefficient value between a pass in which the density can be corrected and a pass in which no density can be corrected.

FIGS. 7A and 7B are tables showing the relationship between the input density and the output density. FIGS. 7A and 7B show control examples of the division ratios k1, k2, k3, and k4 and density correction selection signals sel2, sel3, and sel4. As shown in FIGS. 7A and 7B, it is controlled to change the density division ratio as shown in FIG. 7A or 7B between the lines a, c, e, g, and i on which the density can be corrected in the second and fourth passes, and the lines b, d, f, and h on which the density can be corrected in the third pass, as shown in FIG. 5B.

FIG. 7A shows the relationship between the division ratios k1, k2, k3, and k4 and processing lines. As shown in FIGS. 6A and 6B, the division ratios k2 and k4 are set higher than the division ratio k3 for the lines a, c, e, g, and i. The division ratio k3 is set higher than the division ratios k2 and k4 for the lines b, d, f, and h.

The density division ratio used in the first embodiment is arbitrary as long as it can be controlled in accordance with whether density nonuniformity can be corrected using the sensor.

FIG. 7B shows the relationship between the density correction selection signals sel2, sel3, and sel4 and processing lines. Which of a corrected print density and uncorrected print density is used is selected. This has been described with reference to FIG. 4, and a detailed description thereof will not be repeated.

In the second and subsequent passes, print data is corrected based on the difference between the target print densities of preceding scan operations and a density detected by the sensor. This can suppress density nonuniformity such as a streak caused by a mechanical paper feed error or variations in the nozzles of the inkjet head.

Even when the sensor is arranged on one side of the inkjet head, the disadvantage of a small density correction count owing to arranging the sensor on only one side can be compensated by controlling the density division ratio. Also, the cost of density nonuniformity correction can be reduced.

The first embodiment has exemplified 4-pass printing as a multipass method. However, the multipass method is not limited to 4-pass printing as long as the print mode has at least three passes.

Second Embodiment

In the first embodiment, when calculating a density division coefficient, the density division ratio of each pass is set based on the input density (input density reference). In the second embodiment, unlike the first embodiment, the density division ratio is determined based on the output density (output density reference). More specifically, the print density ratio setting unit sets a print density ratio on the basis of an output image density characteristic stored in advance. The circuit arrangement of the second embodiment is almost the same as that of the first embodiment except for the contents of a pass division table 410 shown in FIG. 4. The same reference numerals as those in the first embodiment denote the same parts, and a description thereof will not be repeated.

FIGS. 8A and 8B are graphs showing the relationship between the input density and the output density. FIG. 8A shows the relationship between the input density and the output density when the output density division ratios of the second and fourth passes are controlled to be higher than that of the third pass. FIG. 8B shows the relationship between the input density and the output density when the output density division ratio of the third pass is controlled to be higher than those of the second and fourth passes.

According to the second embodiment, the pass division table 410 (see FIG. 4) defines input density division ratios k1, k2, k3, and k4 corresponding to output density division ratios. The second embodiment can correct density nonuniformity, similar to the first embodiment.

Third Embodiment

In the first embodiment, the sensor 230 is arranged on one side of the inkjet head 220, as shown in FIG. 5A. In the third embodiment, unlike the first embodiment, sensors 930 are arranged on the two sides of an inkjet head 220. In the first embodiment, the sensor 230 has a width enough to detect the printing states of the second to fourth passes in scanning. In the third embodiment, the sensor 930 is shorter than the inkjet head 220 in the nozzle array direction. The same reference numerals as those in the first embodiment denote the same parts, and a description thereof will not be repeated.

Figures 9A, 9B:
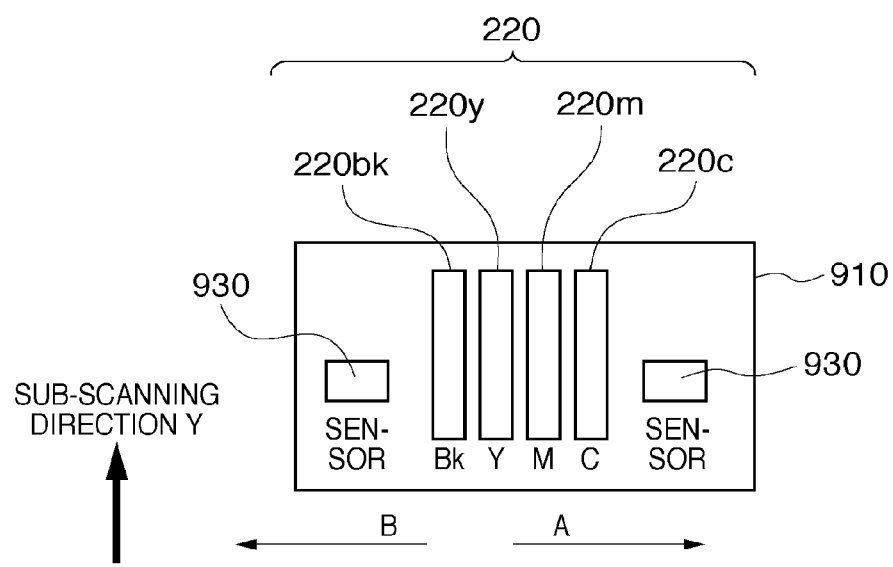
FIG. 9A is a view showing the arrangement of a carriage 910.
FIG. 9B is a view showing passes capable of correcting density nonuniformity.

FIG. 9A is a view showing the arrangement of a carriage 910. FIG. 9B is a view showing passes capable of correcting density nonuniformity. As shown in FIG. 9A, the carriage 910 supports the inkjet head 220 and sensors 930.

As described above, the sensors 930 are arranged on the two, right and left sides of the inkjet head 220, and detect a printing state on a print medium. The sensor 930 has about the ¼ length of the inkjet head 220 in the nozzle array direction. That is, the length of the sensor 930 in the nozzle array direction corresponds to a print medium conveyance amount in scanning in the second pass. Thus, the sensors are arranged in a range smaller than the length of the printhead in the nozzle array direction as long as they can detect the state of printing on a print medium by up to a scan operation ((n−1)th pass) immediately preceding a scan operation (nth pass) of interest.

Figure 10:
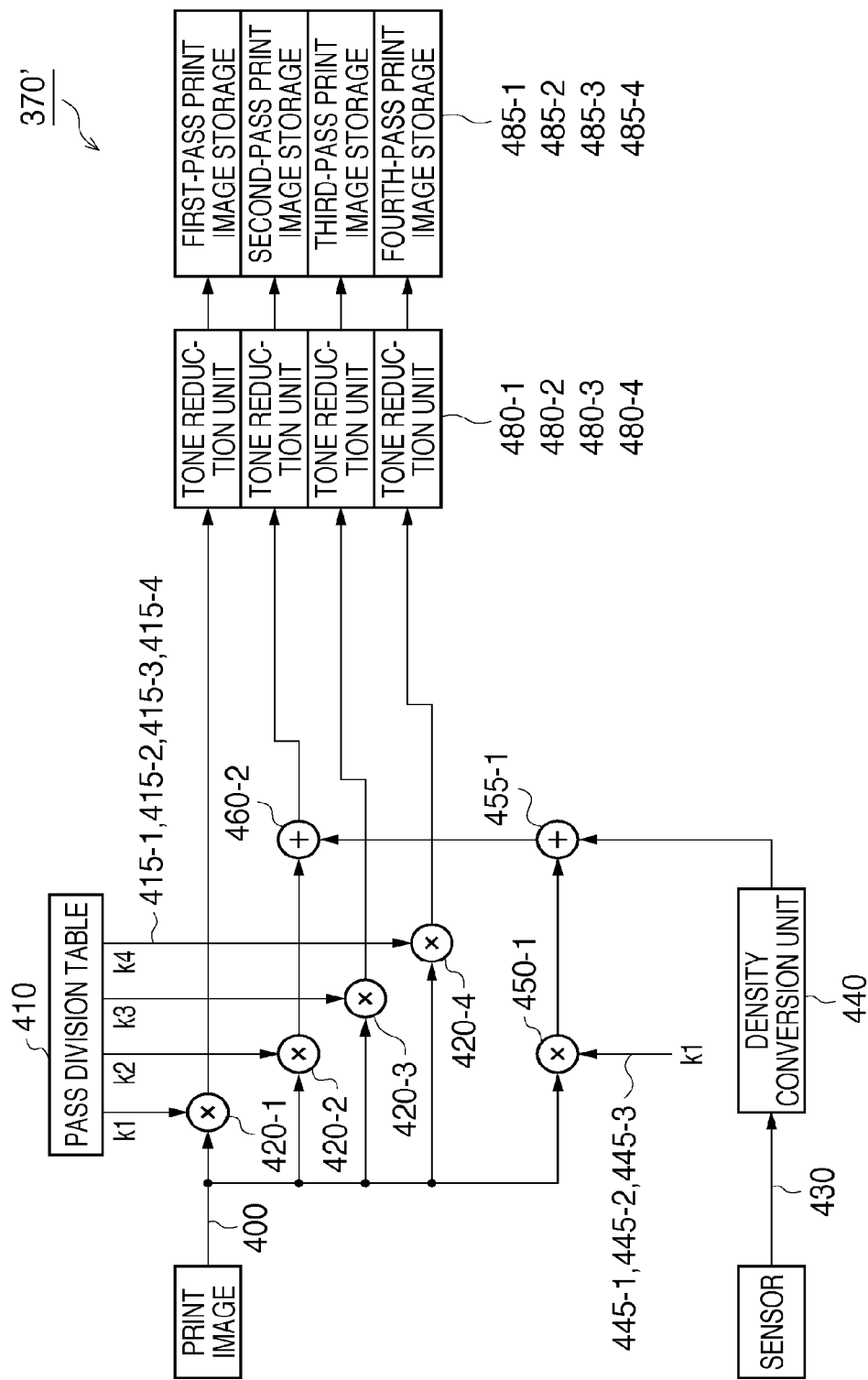
FIG. 10 is a block diagram showing the functional arrangement of a print data generation unit 370' according to the third embodiment.

FIG. 10 is a block diagram showing the functional arrangement of a print data generation unit 370' according to the third embodiment. In the third embodiment, the selectors 465-2, 465-3, and 465-4 shown in FIG. 4 are omitted from the print data generation unit 370', unlike the print data generation unit 370 in the first embodiment. This is because the density suffices to be corrected in only the second pass in the third embodiment. Hence, only the second pass uses a density-corrected output from an adder 460-2, and the remaining passes directly use print densities divided in accordance with a pass division table 410. In this case, the density division ratio of the second pass capable of correcting density nonuniformity is set higher than those of the third and fourth passes in order to enhance the density nonuniformity correction effect.

According to the third embodiment, density nonuniformity is corrected in only the second pass regardless of the processing line. Thus, density nonuniformity can be corrected by a simple arrangement without complicating the control circuit. Since the sensors 930 are arranged on the two sides of the inkjet head 220, the printing state of the first pass can be detected in scanning in the second pass. In both the scanning directions A and B, density nonuniformity can be corrected in only scanning of the second pass. In both the scanning directions A and B, processing to switch the density division ratio can be omitted.

Fourth Embodiment

In the first to third embodiments, the density division ratio of each pass is set in accordance with whether the sensor can detect a printing state. This is because density nonuniformity can be corrected in a pass in which the sensor can detect a printing state. However, density nonuniformity changes depending on the input density. Generally in a low-density input image (or a faint input image), density nonuniformity stands out more readily than in a high-density input image (or a dark input image). The fourth embodiment appropriately executes density division considering the difference in density nonuniformity characteristic depending on the input density. The same reference numerals as those in the first embodiment denote the same parts, and a description thereof will not be repeated.

In the fourth embodiment, similar to the first embodiment, the density is corrected in the second and fourth passes for the lines a, c, e, g, and i, and in the third pass for the lines b, d, f, and h (see FIG. 5B).

FIG. 11 is a graph showing the relationship between the input density and the output density in the fourth embodiment. Assume that two different input densities A and B are input (discharged) for a print medium. When the input density A is input, letting k1A, k2A, k3A, and k4A be the division ratios of the first, second, third, and fourth passes, k1A+k2A+k3A+k4A=1 (100%) holds. When the input density B is input, letting k1B, k2B, k3B, and k4B be the division ratios of the first, second, third, and fourth passes, k1B+k2B+k3B+k4B=1 (100%) holds.

FIG. 12 is a table showing the division ratios of the input densities A and B shown in FIG. 11. In the first embodiment, passes capable of density correction are classified into two depending on the processing line. FIG. 12 exemplifies density division ratios for the lines a, c, e, g, and i on which the density can be corrected in the second and fourth passes.

For the input densities A and B, the division ratios k2 and k4 of the second and fourth passes in which the density can be corrected are set higher than the division ratio k3 of the third pass, similar to the first embodiment. The division ratios of the second and fourth passes are 1.25 times higher than that of the third pass for the input density B, and three times higher than that of the third pass for the input density A. More specifically, when the density of an input image is lower than a threshold, the print density ratio setting unit sets a higher print density ratio in scanning in which the density is corrected than that when the density of an input image is equal to or higher than the threshold.

According to the fourth embodiment, as the input density is lower, the division ratio of a pass in which the density can be corrected is set higher. As a result, density nonuniformity can be made less conspicuous in a low-density input image.

The fourth embodiment has exemplified the density division ratio for the lines a, c, e, g, and i on which the density can be corrected in the second and fourth passes. However, the density division ratio can be controlled similarly for the lines b, d, f, and h on which the density can be corrected in the third pass.

When the density of the first pass is excessively low, it is difficult to detect density nonuniformity. Thus, when the density of an input image is low, the density of the first pass is set to a value enough to detect density nonuniformity. More specifically, when the density of an input image is lower than a threshold, the print density ratio setting unit sets a print density ratio so as to print on a print medium at at least a predetermined density in the first scanning.

Other Embodiments

The embodiments may also be applied to a system including a plurality of devices (e.g., a host computer, interface device, reader, and printer), or an apparatus (e.g., a copying machine, multi-functional peripheral, or facsimile apparatus) formed by a single device.

The present invention may also be applied by supplying a computer-readable storage medium (or recording medium) which stores the computer program codes of software for implementing the functions of the above-described embodiments to a system or apparatus. The present invention may also be applied by reading out and executing the program codes stored in the storage medium by the computer (or the CPU or MPU) of the system or apparatus. In this case, the program codes read out from the storage medium implement the functions of the above-described embodiments, and the storage medium which stores the program codes constitutes the embodiments. Also, the present invention includes a case wherein an operating system (OS) or the like running on the computer performs some or all of actual processes on the basis of the instructions of the program codes and thereby implements the functions of the above-described embodiments.

The present invention also includes a case wherein the program codes read out from the storage medium are written in the memory of a function expansion card inserted into the computer or the memory of a function expansion unit connected to the computer, and the CPU of the function expansion card or function expansion unit performs some or all of actual processes on the basis of the instructions of the program codes and thereby implements the functions of the above-described embodiments.

When the embodiments are applied to the computer-readable storage medium, the storage medium stores computer program codes corresponding to the above-described functional arrangements.

The sensor length, arrangement, pass division count, pass division ratio, and the like in the first to fourth embodiments are merely examples, and are not limited as constituent elements of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-116294, filed Apr. 25, 2008, which is hereby incorporated by reference herein in its entirety.

What is claimed is:

1. An image processing apparatus which forms a halftone image on a print medium using multipass processing of printing a single area on the print medium N (N is an integer of not less than 2) times, the apparatus comprising:
   setting unit configured to set a print density ratio of each scan operation;
   generating unit configured to generate print data of each scan operation; and
   obtaining unit configured to obtain a state of printing on the print medium,
   wherein the generating unit corrects the print data based on the printing state obtained by the obtaining unit, and
   wherein the setting unit sets the print density ratio higher in printing for which the print data is corrected by the generating unit than for printing in which the print data is not corrected.

2. The apparatus according to claim 1, wherein the setting unit sets the print density ratio on the basis of a density of an input image.

3. The apparatus according to claim 1, wherein the setting unit sets the print density ratio on the basis of an output image density characteristic stored in advance.

4. The apparatus according to claim 2, wherein when the density of the input image is smaller than a threshold, the setting unit sets the print density ratio to be higher for printing in which the density is corrected than when the density of the input image is not smaller than the threshold.

5. The apparatus according to claim 2, wherein when the density of the input image is smaller than a threshold, the setting unit sets the print density ratio to print on the print medium at at least a predetermined density in first printing.

6. An image processing method of forming a halftone image on a print medium using multipass processing of printing a single area on the print medium N (N is an integer of not less than 2) times, the method comprising the steps of:
   setting a print density ratio of each scan operation;
   generating print data of each scan operation; and
   obtaining a state of printing on the print medium,
   wherein the generating step corrects the print data based on the printing state obtained by the obtaining step, and
   wherein the setting step sets the print density ratio higher for printing in which the print data is corrected in the generating step than in printing in which the print data is not corrected.

7. A non-transitory computer-readable storage medium storing a computer program which is read and executed by a computer to cause the computer to execute the steps defined in claim 6.

* * * * *